Figure 1:
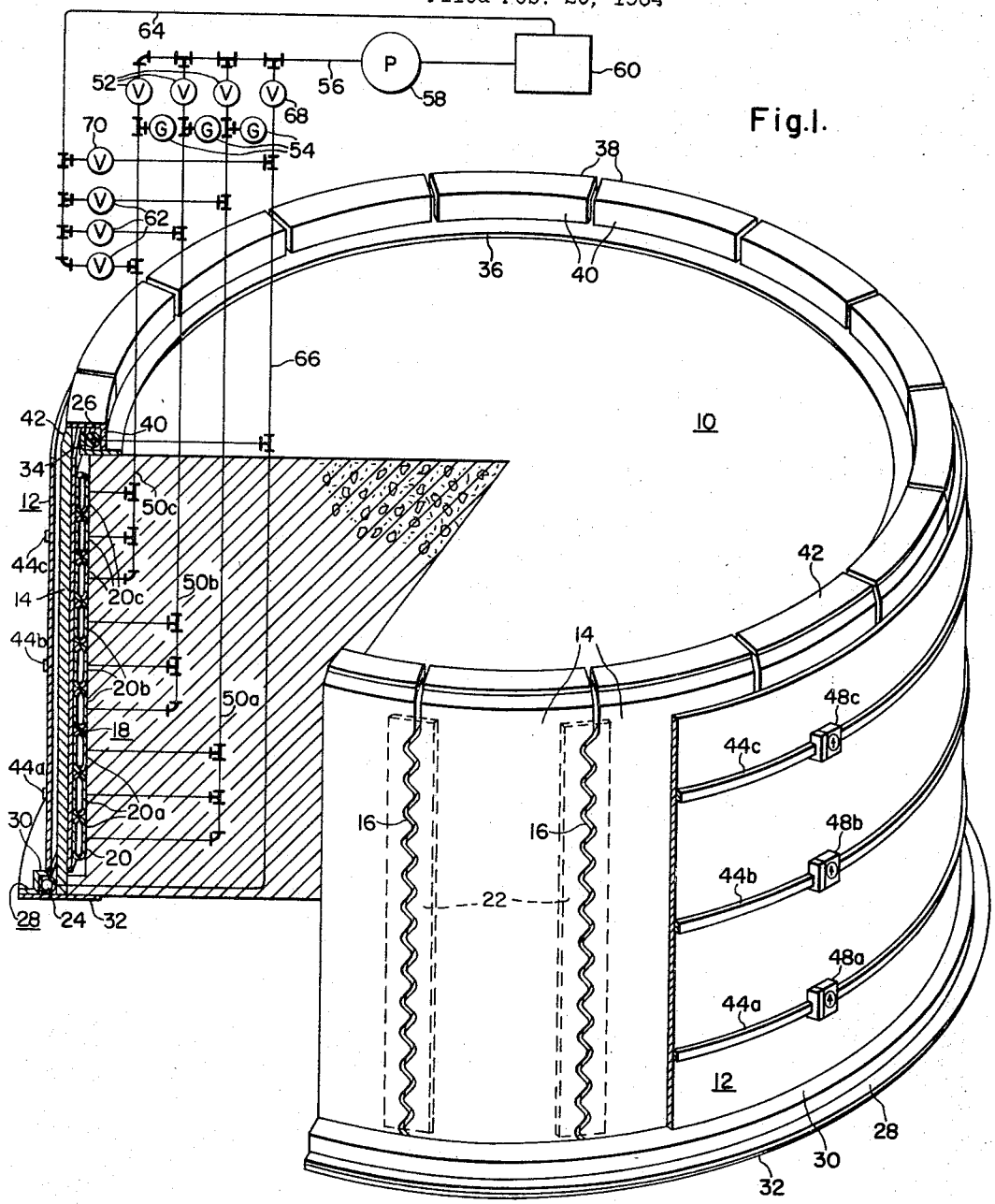

Oct. 3, 1967　　　　G. W. ELLENBURG　　　　3,344,634
SIZING CYLINDRICAL SECTIONS
Filed Feb. 20, 1964

INVENTOR
George W. Ellenburg
BY
ATTORNEY

United States Patent Office 3,344,634
Patented Oct. 3, 1967

3,344,634
SIZING CYLINDRICAL SECTIONS
George W. Ellenburg, Ardmore, Pa., assignor to Westinghouse Electric Corporation, Pittsburgh, Pa., a corporation of Pennsylvania
Filed Feb. 20, 1964, Ser. No. 346,305
9 Claims. (Cl. 72—34)

The present invention relates to stretching and sizing cylindrical sections and other sections of substantially cylindrical contour, and more particularly to stretching and sizing such sections of very large diameter or diameters.

As used herein, the term "cylindrical section" does not necessarily infer circularity of cross section. Rather, any oval or elliptical (including circular) contour is contemplated which can be appropriately expanded by engagement with suitably shaped structural members.

Heretofore, cylindrical sections in the order of six feet in diameter have been stretched and sized by a machine that utilizes a hydraulically operated piston and cylinder arrangement to draw a tapered plug through a circumferential array of correspondingly tapered shoes which are thus expanded against the interior of the cylindrical section. Aside from the initial cost of these machines, the maximum size of cylindrical section which can be worked upon by this type of machine is limited due to the tremendous frictional forces involved in the operation of the machine. Other known forms of stretching and sizing equipment are even more limited as to the maximum size of the work piece which can be accommodated.

The equipment of the prior art, moreover, has not been able adequately to remove fully the distortions such as barreling, hourglassing or conical and parallel shapes frequently encountered in the stretching and sizing operations. Further, prior equipment was not readily capable of intentionally imparting a predetermined barrel, hourglass or conical shape when desired particularly in the relatively large sizes of cylindrical sections.

In the manufacture of casings for rocket vehicles and the like, it is necessary to produce casing sections as large as twenty feet and more in diameter. Inasmuch as two or more of such casing sections, in the case of the larger vehicles, are assembled to produce the casing structure, it is necessary that the casing sections be accurately sized so as to produce a matched fit, either between adjacent casing sections or with the cone and nozzle assemblies. Even in the case of one piece casings, it is essential to accurately control the diameter and circularity of the casing in order to ensure repetitivity of performance and to minimize the development of strain points during operation of the vehicle.

In view of the foregoing, it is therefore an object of the invention to provide improved apparatus for stretching and sizing cylindrical sections. More specifically it is an object of the invention to provide such apparatus which is capable of use with rather large sections.

Another object of the invention is the provision of stretching and sizing equipment having relatively few moving parts and in which frictional engagement therebetween is minimized.

A further object of the invention is the provision of the equipment of the character described which is capable of removing or correcting various types of distortions in the work piece or of intentionally introducing predetermined distortions into the work piece.

Still another object of the invention is the provision of stretching and sizing equipment wherein the individual components thereof are actuated by hydraulic means rather than primarily by frictional engagement.

Briefly, the invention comprises a plurality of expanding means or shoes assembled into a circumferential array and mounted for movement against the adjacent surfaces of the cylindrical section or work piece to be stretched and sized. In a specific form of the invention the array of shoes is mounted for movement outwardly against the inner surfaces of the work piece. An expansion joint arrangement is provided between each adjacent pair of the shoes and means are associated with the junction between the shoes to prevent the work piece of hose from being extruded therebetween.

The aforementioned shoes are expanded by hydraulically actuated expansion means which desirably are substantially coextensive with the expansion shoes and the work piece when placed thereover. Desirably, a plurality of such expansion means are provided which can be actuated individually for the purpose of removing the various types of distortions such as barreling, hourglassing and conicality which may be encountered in the work piece after the principal stretching and sizing operation. Of course, it is contemplated that equivalently actuated expansion means can also be employed in any of the configurations thereof contemplated by the invention.

Figure 2:
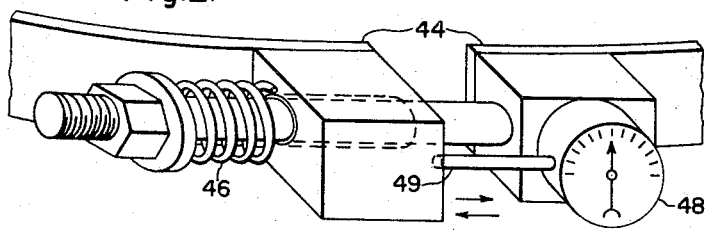

These and other features, objects and advantages of the invention will be made apparent during the forthcoming description of an exemplary embodiment thereof, when taken in conjunction with the accompanying drawings wherein:

FIGURE 1 is an isometric view, partially in section of one arrangement of the stretching and sizing equipment made in accordance with the invention; and FIG. 2 is a partial isometric view of one form of circumferential measuring arrangement useful with the invention.

Referring now to the drawings in detail, the illustrative form of the invention depicted therein comprises a backup member 10 having a circumferential configuration substantially identical to that of the work piece 12 but spaced inwardly therefrom. Accordingly, in the illustrative arrangement both the work piece 12 and the backup member 10 are of right circular cylindrical configuration. The work piece 12 or casing section can be fabricated from steel or other appropriate structural material which is required in the finished casing. On the other hand, the backup member 10 in the illustrated arrangement is formed from poured concrete of solid right circular cylindrical configuration. In very large sizes of the stretching and sizing equipment, an axial opening can be left in the backup member 10 of such size as to conserve concrete without unduly weakening the backup member for the purpose intended. Alternatively, and particularly in the smaller sizes of such equipment, the backup or compression member 10 can be fabricated from a rolled and welded steel annulus of sufficient thickness as to be capable of taking without yielding the compression imparted thereto by the expansion means presently to be described.

A plurality of expansion shoes 14 are closely fitted in an annular array around the vertical periphery of the compression member 10 but are spaced outwardly therefrom to accommodate the expansion means presently to be described. The vertical lateral edges of each shoe 14 is provided with a serrated or oscillatory configuration both of which intermesh with the serrated configuratilons 16 of adjacent shoes. The intermeshing character of the opposed serrations 16 at each junction between adjacent shoes 14 therefore provides support for the work piece 12 when the shoes 14 are expanded outwardly and the separations therebetween increase. The serrated configuration this prevents the adjacent portions of the work piece from being extruded into the junctions.

The individual shoes 14 can be formed by machining a rolled and welded hollow cylinder (not shown) having substantially the same outer diameter as the inner diameter of the work piece 12. The aforementioned hollow cylinder is, of course, of the same wall thickness as that of each shoe 14. After the hollow cylinder is machined to the desired diameter as aforesaid, the individual shoes 14 are cut from the cylinder with the aid of the plasma torch or other cutting torch. The cutting operation, of course, leaves sufficient space between the cut shoes so that the shoes can be retracted inwardly a sufficient distance, such as that shown in FIG. 1 where the shoes 14 are illustrated in their retracted position relative to the work piece 12, without an interference engagement of their intermeshing serrated edges.

The expansion shoes 14 are therefore arrayed, in this example, in an upstanding annular or circular arrangement about the vertical periphery of the compression member 10 but are spaced outwardly therefrom to allow for sandwich-insertion of expansion means denoted generally by the reference character 18. One arrangement of such expansion means 18 includes a plurality of circular, collapsible hoses 20 which are stacked one on the other so that in their collapsed or expanded condition they substantially fill the space between the expansion shoes 14 and the compression member 10. It is also contemplated that a single, spirally wound hose or one or more bladders having the requisite area and configuration can be employed.

In the present arrangement, nine such hoses 20 are employed in encompassing relation with the compression member 10 and are actuatable in groups of three as denoted by the reference characters 20a, 20b and 20c. The purpose of such grouping subsequently will be elaborated upon. It will be appreciated, of course, that a greater or lesser number of hoses 20 or of groups such as 20a and 20b of hoses 20 can be employed to advantage in certain applications, or that each group of hoses can be replaced by a single suitably shaped inflatable bladder member.

In the retracted position of the expansion shoes 14 as shown, there is relatively little space between the outer surface thereof and the inner surface of work piece or cylindrical section 12 so that when the hoses 20 are pressurized to expand the shoes 14 against the work piece 12 there is little or no loss of collapsed width of the hoses 20. Thus, the hoses 20, even when pressurized in the manner described below in greater detail, still coextend with substantially the entire adjacent area of the shoes 14. Further, the pressurization of the hoses 20 and their frictional engagement with the adjacent surfaces of the shoes 14 and the compression member 10 prevent their moving downward should any loss of such collapsed width occur.

When so pressurized, extrusion of the hose material into the serrated junctions between the shoes 14 is positively prevented by a relatively thin vertical strip 22 which overlies each of the junctions on the inner surface of the expansion shoes 14. The strips 22 desirably are of relatively thin structural material, such as steel, and desirably the edges thereof adjacent the hoses 20 are rounded or chamfered to prevent their abrading the adjacent portions of the hoses 20.

The hoses 20 are capable, of course, of being expanded when pressurized to an extent sufficient to cause the expansion shoes 14 to stretch the work piece 12 through its yield point for the proper sizing thereof.

After the hoses 20 have been pressurized and the cylindrical section 12 has been stretched and sized, the hoses 20 are then depressurized by the conduit arrangement presently to be described. The expansion shoes 14 are then returned to their retracted positions by a pair of pressurizable hoses 24 and 26, which will now be described in detail together with cooperating structure of the stretching and sizing equipment. The hoses 24 and 26 are also of the circular collapsible variety but are shown in FIG. 1 in their pressurized condition whereby the shoes 14 are moved to their retracted positions.

The lower retracting hose 24 is confined between a circular bracket 28 and the lowermost outer surfaces of the expansion shoes 14. In furtherance of this purpose, the circular bracket 28 is provided with an inwardly extending lip portion 30, which overlies the major proportion of the lower retracting hose 24. The bracket 28 is secured adjacent its outer edge to an annular footer plate 32 which in turn is secured to the compression member 10 by any suitable fastening means such as anchor bolts (not shown). The bracket lip 30 is, of course, spaced outwardly from the expansion shoes 14 a sufficient distance to provide clearance between the bracket 28 and the shoes 14 at the fully expanded location of the latter.

The upper retracting hose 26 is similarly confined between an upstanding flange 34 of a circular bracket 36 secured to the top of the compression member 10 and overlying its upper peripheral edge. The bracket 36 can be secured to the compression member 10, assuming the latter is made from concrete by means of anchor bolts or the like (not shown).

Cooperating with the upper annular bracket 36 is a plurality of relatively inverted bracket members 38 secured respectively to the upper edges of the expansion shoes 14. Each of the bracket members 38 is provided with a depending vertical flange portion 40 which supplies the inner confinement of the upper retracting hose 26 and which are engaged by the hose 26 when pressurized to aid in moving the expansion shoes 14 inwardly to their retracted positions.

To aid in mounting the work piece or cylindrical section 12 on the stretching and sizing equipment as shown, the expansion shoes 14 are each chamfered as denoted by the reference character 42 adjacent their upper edges. When thus inserted, the amount of stretch imparted to the various portions of the cylindrical section, in this case the upper, middle and lower portions, is measured by tightly fitted bands 44a, 44b and 44c. As better shown in FIG. 2 of the drawings, the ends of each band generally indicated 44 are secured by a relatively strongly tensed spring-loaded bolt arrangement (denoted by the reference character 46) to preserve the tightly fitting character of the bands 44. The spring is strong enough to overcome the frictional forces around the band but not strong enough to stretch the band. The stretch imparted to the cylindrical section 12 in the area of each band 44, then, corresponds to the amount of increased separation of the ends of the associated band, which separation is measured by a suitable gauge or extensionometer denoted by the reference character 48 and provided with a probe 49 for this purpose. In FIG. 1, the bands 44a, 44b and 44c are illustrated with their associated gauges 48a, 48b and 48c, respectively.

Following the stretching operation, after the hoses 20 have been depressurized, the gauges 48a, 48b, and 48c then indicate the extent to which the various portions of the work piece have been permanently stretched. If the required diameter is attained and if the readings of the three gauges 48a, 48b and 48c are substantially identical (which indicates that a condition approaching true cylindricality has been attained), the cylindrical section then can be removed from the equipment. Since the work piece 12 is stretched beyond its yield point for proper sizing, any out-of-roundness (in the case of circular cylindrical sections) or the like will be removed.

If, of course, the circumferential readings of the gauges 48a, 48b and 48c are not sufficiently large, the work piece 12 can be restretched with the application of greater pressure to the hoses 20 until the desired increase in diameter of the work piece is attained. If desired, a calibration chart can be readily devised to yield the amount of permanent set expected for a given reading on each of the gauges 48a, 48b and 48c after the yield point is initially passed.

In the case where different readings are indicated by the gauges 48a, 48b and 48c, when the hoses 20 are depressurized, distortions known respectively as barreling, hourglassing or conicality have been introduced or preserved in the work piece through the stretching operation. In virtually every case these distortions can be removed, particularly if the cylindrical section 12 has not been stretched to its full diametric requirement during the first stretching operation.

In accordance with the invention, conduit means for supplying a hydraulic or equivalent fluid to the hoses 20 are arranged such that the groups of hoses 20a, 20b and 20c can be pressurized independently of one another. This is accomplished by a corresponding number of branched conduit arrangements denoted generally by the reference characters 50a, 50b and 50c which include individual throttling valves 52 and pressure gauges 54. The branched conduits 50a, 50b and 50c couple the hoses 20 of each group 20a, 20b and 20c to the discharge conduit 56 of a suitable pump 58, whose intake in turn is coupled to a source of the hydraulic fluid, denoted generally by the reference charcter 60. When it is desired to depressurize one or more of the groups of hoses 20a, 20b and 20c, one or more of the corresponding dump valves 62 are opened which permit a pressure relieving drain of the fluid back to the source tank 60 through a return conduit 64.

In a similar manner, the hoses 24 and 26 are pressurized and depressurized by means of a branched conduit 66 and throttling valve 68, and the dump valve 70 in associated conduit which couples the branch conduit 66 to the return conduit 64, respectively.

With the arrangement shown, then, each of the work piece portions respectively adjacent the measuring bands 44a, 44b and 44c can have varying amounts of stretch imparted thereto by correspondingly varying the pressurization of the groups of hoses 20a, 20b or 20c respectively. In the case of the aforementioned distortions, suitably differentiated pressurizations can be imparted to the groups of hoses 20a, 20b and 20c by suitable manipulation of the throttling valves 52 until the readings of the related gauges 48a, 48b and 48c are substantially identical.

On the other hand, it is contemplated that intentional deviations from true cylindricality can be introduced into the work piece 12 by intentionally varying the amount of stretch imparted by the groups of hoses 20a, 20b and 20c to the correspondingly adjacent portions of the work piece 12.

It will be seen from the foregoing that a novel efficient, and versatile form of stretching and sizing equipment has been disclosed herein. Because the frictional engagement of its corresponding parts are kept to a minimum, there is virtually no limit to the size to which the equipment can be constructed, as indicated by the sizes of appropriate work pieces. Moreover, the unit force required for expansion of the shoes 14 is relatively low since the force is applied by the expansion means or the hoses 20 over an area coextensive or very nearly coextensive with the entire adjacent surfaces of the work piece.

The descriptive and illustrative materials employed herein are presented for purposes of exemplifying the invention and are not to be taken as limitative thereof. Accordingly, numerous embodiments of the invention will occur to those skilled in the art without departing from the spirit and scope of the invention. Moreover, it is to be understood that certain features of the invention can be employed without a corresponding use of other features.

Accordingly what is claimed as new is:

1. Apparatus for stretching and sizing a casing section, said apparatus comprising a plurality of expansion shoes mounted in an annular array having a configuration corresponding to that of said casing section, a compression member mounted adjacent said array of shoes and being substantially coextensive therewith, said array of shoes being spaced from said compression member and normally spaced from said casing section when so mounted said array of shoes being mounted for movement toward and away from positions of forcible engagement with said work piece, and fluid actuated expansion means substantially coextensive with said array of shoes and with said work piece when so mounted for moving said array of shoes toward and away from said positions of forcible engagement, said expansion means being disposed in engagement with said array of shoes and in encompassing relation with said compression member.

2. Apparatus for stretching and sizing a casing section, said apparatus comprising a plurality of expansion shoes mounted in an array having a configuration corresponding to that of said casing section, a compression member mounted adjacent said array of shoes and being substantially coextensive therewith, said array of shoes being spaced from said compression member and normally spaced from said casing section when so mounted, said array of shoes being mounted for movement toward and away from positions of forcible engagement with said work piece, first expansion means substantially coextensive with said array of shoes and with said work piece when so mounted for moving said array of shoes to said positions of forcible engagement, said first expansion means being disposed in coextensive engagement with said array of shoes and with said compression member, and second fluid actuated expansion means mounted in coextensive annular engagement with said array of shoes and with annular portions of said compression member for moving said array of shoes away from said positions of forcible engagement.

3. Apparatus for stretching and sizing a casing section said apparatus comprising a plurality of expansion shoes mounted in an array having a configuration corresponding to that of said casing section, a compression member mounted adjacent said array of shoes and being substantially coextensive therewith, said array of shoes being spaced from said compression member and normally spaced from said casing section when so mounted, said array of shoes being mounted for movement toward and away from positions of forcible engagement with said work piece, fluid actuated expansion means substantially coextensive with said array of shoes and with said work piece when so mounted for moving said array of shoes toward and away from said positions of forcible engagement, said expansion means being disposed in annular engagement with said array of shoes and in encompassing annular engagement with said compression member, and means forming part of and overlying the junctions between said shoes for preventing the extrusion of said casing section and said expansion means into said junctions.

4. Apparatus for stretching and sizing a generally tubular casing section, said apparatus comprising a plurality of expansion shoes arranged in an array having a configuration corresponding to that of said section, said array being disposed inwardly of said section when placed on said apparatus, a centrally disposed compression member spaced inwardly of said array of shoes and having a periphery corresponding in contour to that of said array, said array of expansion shoes being mounted for movement toward and away from positions of forcible engagement with said section when so placed, and inflatable expansion means substantially filling the space between said array of shoes and said compression member for moving said array of shoes toward and away from said section, said expansion means being substantially annularly coextensive with said array of shoes and with said casing section when so placed.

5. Apparatus for stretching and sizing a generally tubular casing section, said apparatus comprising a plurality of expansion shoes arranged in an array having a configuration corresponding to that of said section, said array being disposed inwardly of said section when placed on said apparatus, a centrally disposed compression member spaced inwardly of said array of shoes and having a periphery corresponding in contour to that of said array, said array of expansion shoes being mounted for movement toward and away from positions of forcible engagement with said section when so placed, expansion means filling the space between said array of shoes and said compression member for moving said array of shoes toward and away from said section, said expansion means being substantially coextensive with said array of shoes and with said casing section, and at least one measuring band means girdling said tubular section for indicating the enlargement thereof.

6. Apparatus for stretching and sizing a generally tubular casing section, said apparatus comprising a plurality of expansion shoes arranged in an array having a configuration corresponding to that of said section, said array being disposed inwardly of said section when placed on said apparatus, a centrally disposed compression member spaced inwardly of said array of shoes and having a periphery corresponding in contour to that of said array, said array of expansion shoes being mounted for movement toward and away from positions of forcible engagement with said section when so placed, expansion means filling the space between said array of shoes and said compression member for moving said array of shoes toward and away from said section, said expansion means being substantially coextensive with said array of shoes and with said casing section, and a plurality of circumferential measuring band means girdling said tubular section, said band means being spaced from one another and being generally parallel for measuring the enlargement of the associated portions of said tubular section.

7. Apparatus for stretching and sizing a generally tubular casing section, said apparatus comprising a plurality of expansion shoes arranged in an array having a configuration corresponding to that of said section, said array being disposed inwardly of said section when placed on said apparatus, a centrally disposed compression member spaced inwardly of said array of shoes and having a periphery corresponding in contour to that of said array, said array of expansion shoes being mounted for movement toward and away from positions of forcible engagement with said section when so placed, an expansion means filling the space between said array of shoes and said compression members for moving said array of shoes toward and away from said section, said expansion means being substantially coextensive with said array of shoes and with said casing section, a plurality of circumferential measuring band means girdling said tubular section, said band means being spaced from one another and being generally parallel for measuring the enlargement of the associated portions of said tubular section, said expansion means being divided into a plurality of circumferential groups disposed generally adjacent said portions respectively, said groups being separately expansible and contractible so that differing amounts of stretch or enlargement can be imparted to said casing section portions respectively.

8. Apparatus for stretching and sizing a generally tubular casing section, said apparatus comprising a plurality of expansion shoes arranged in an array having a configuration corresponding to that of said section, said array being disposed inwardly of said section when placed on said apparatus, a centrally disposed compression member spaced inwardly of said array of shoes and having a periphery corresponding in contour to that of said array, said array of expansion shoes being mounted for movement toward and away from positions of forcible engagement with said section when so placed, a plurality of annular collapsed pressurizable hoses normally filling the space between said array of shoes and said compression member, said hoses being closely spaced and extending circumferentially of said compression member and of said array of shoes, and means for pressurizing said hoses with a suitable fluid to force said array of shoes against said tubular section when mounted on said equipment.

9. Apparatus for stretching and sizing a generally tubular casing section, said apparatus comprising a plurality of expansion shoes arranged in an array having a configuration corresponding to that of said section, said array being disposed inwardly of said section when placed on said apparatus, a centrally disposed compression member spaced inwardly of said array of shoes and having a periphery corresponding in contour to that of said array, said array of expansion shoes being mounted for movement toward and away from positions of forcible engagement with said section when so placed, a plurality of annular collapsed pressurizable hoses normally filling the space between said array of shoes in said compression member, said hoses being closely spaced and extending circumferentially of said compression member and of said array of shoes, and means for pressurizing said hoses with a suitable fluid to force said array of shoes against said tubular section when mounted on said equipment, said hoses being divided into a plurality of groups corresponding to adjacent circumferential portions of said tubular section when so placed, said pressurizing means being capable of pressurizing said groups independently of one another so that differing degrees of enlargement or stretch can be imparted to said tubular section portions respectively.

References Cited

UNITED STATES PATENTS

| | | | |
|---|---|---|---|
| 453,740 | 6/1891 | Coultas | 72—393 |
| 1,825,030 | 9/1931 | Vaughn | 72—393 |
| 2,999,528 | 9/1961 | Kurtak | 72—34 |

FOREIGN PATENTS

| | | |
|---|---|---|
| 395,544 | 7/1933 | Great Britain. |
| 444,331 | 3/1936 | Great Britain. |

RICHARD J. HERBST, *Primary Examiner.*

L. A. LARSON, *Assistant Examiner.*